United States Patent Office 3,073,700
Patented Jan. 15, 1963

3,073,700
DRIED BLOOD PIGMENT PREPARATION FOR COMMINUTED MEAT PRODUCTS AND METHOD OF PREPARING SAME
John A. Ziegler, Scarborough, Ontario, Canada, assignor to The Griffith Laboratories, Inc., Chicago, Ill.
No Drawing. Filed June 30, 1961, Ser. No. 120,955
13 Claims. (Cl. 99—21)

This invention relates to dried blood pigment preparation for comminuted meat products and method of preparing same.

It is one object of this invention to provide a blood-base red colouring composition which is stable against putrefaction and which can be stored and shipped without refrigeration.

It is another object of the invention to provide the colouring composition in a dry form.

It is a further object of the invention to provide the colouring composition in a dry form stabilized against oxidation.

It is an additional object of the invention to provide a colouring composition in a dry form stabilized against colour deterioration when mixed with other normally used ingredients in sausage manufacture such as seasonings and fillers.

It is still a further object of the invention to provide a colouring composition in a dry form which can be subsequently sterilized without colour deterioration.

Fluid, whole blood, either defibrinated or treated with a chemical anticoagulant, is currently being used in a wide variety of comminuted meat products such as sausages, frankfurters, bologna, loaves, canned luncheon meat and meat spreads to aid in imparting a desirable red colour to the finished meat product. The colour-bearing ferroprotein constituent in blood, which is hemoglobin, is capable of undergoing the same chemical reactions as the ferroprotein constituent, myoglobin, in lean meat to produce the well known so-called cured meat colour which is reddish pink.

Manufacturers who perform killing on their own premises have access to supplies of fluid blood for use in their own sausage kitchens, but others who do not kill are compelled to purchase their supplies elsewhere. At least in part because of its high moisture content, which approximates 80%, fluid blood is very highly perishable and rather quickly undergoes bacterial or enzymatic deterioration or decomposition. Because of this, the use in food products of blood after storage under less than ideal conditions presents certain important sanitary and hygienic problems which could involve serious health hazards. There is no known method of sterilizing large quantities of packing house blood because it is never collected under totally aseptic conditions. Moreover, owing to its high lability, it is inconvenient to store and to transport and it must be refrigerated. When used in a meat product it is not possible to combine the blood with other ingredients such as salt, spices, essential oils or spice extractives, or fillers, for addition as a unit mixture to a given meat processing batch, and the blood must always be stored and added separately.

It has long been desirable to overcome the aforementioned deficiencies relating to the use of liquid blood and to make it available in a dry pulverulent form stable against putrefaction, not requiring refrigeration for storage or for transportation, and which could be sterilized to render it substantially free of bacteria.

Heretofore, attempts have been made to prepare the colouring matter of blood in a dry form suitable as a source of desirable red colour in meat products such as sausages, meat loaves and the like. Such attempts have not been successful because the dried product has had an intense brown colour which is carried over into the meat product in which it is used. My invention concerns a means of treating the blood pigment and subsequently drying it to preserve the red colour. It is to be understood that although I prefer to use the red blood cell fraction of edible animal blood, the invention may be practised with similar facility by using fluid whole blood as starting material. The reason for preferring the red blood cell fraction is that it contains a higher concentration of active pigment material than whole blood.

Whole blood for the purposes of this invention may be considered to be a mixture of the pigment hemoglobin, which is contained in the red blood cells, and plasma which is a fluid carrier for the cells. When blood is collected in a sanitary and hygienic manner from slaughtered animals, it is advantageous to add a chemical agent, known as an anticoagulant to maintain the fluid condition and to prevent the blood from coagulating. Such an agent may be a water soluble alkali metal salt of phosphoric acid or of polyphosphoric acid such as sodium orthophosphate, sodium hexametaphosphate, sodium pyrophosphate, sodium tripolyphosphate, or it may be sodium citrate or sodium tartrate. Whatever agent is used, it is dissolved in water, then added to and mixed with the blood upon collection.

The invention may be carried out using the anticoagulant treated whole blood or defibrinated blood described above, and in the preferred method anticoagulant treated whole blood is run through a centrifugal separator thereby to effect a separation of the plasma, which will contain largely all the anticoagulating agent which was added, and of the red blood cells. In the process, as is known, the separation results in approximately two parts by volume plasma and one part red blood cells. The latter appears as a viscous, purplish red fluid and will be referred to hereinafter as "red blood cells."

When attempts are made to dry the red blood cells the resulting product because of oxidation is brown in colour or dissolves in water to give a brown solution. I have discovered, however, that by suitable fore-treatment, the red blood cells can subsequently be converted into a dry powder which is instantly soluble in water to yield a blood red solution.

To effect this treatment I add to a given weight of red blood cells an aqueous solution of a reducing agent such as ascorbic acid, erythorbic acid, or any alkali metal salt thereof, in quantity so as to convert all methemoglobin and oxyhemoglobin to hemoglobin, and to maintain a measurable excess. During the drying step of the process, this excess reducing agent serves to inhibit oxidation of the nitrosohemoglobin thereby to prevent the formation of brown colour.

After reaction with the reducing agent, I add an aqueous solution of an alkalin metal nitrite in quantity sufficient only to convert the reduced hemoglobin to nitrosohemoglobin which reaction occurs fairly rapidly at ordinary room temperatures and under the slightly acid conditions of the reaction mixture which will be in the range of pH 6.5 to 6.8. I then add a buffer solution, which may be an aqueous solution of any normally alkaline-reacting substance such as sodium hydroxide, sodium carbonate, sodium phosphate, etc., although I prefer to use sodium bicarbonate, in order to shift or adjust the pH in the range 7.3 to 8.0. The latter pH adjustment has been found to be important in preserving the red colour during drying. Although the slight excess of aforementioned reducing agent acts to prevent oxidation, the combination of reducing agent plus alkaline buffer has been found to be more effective than either alone.

Examples

|  | 1 | 1A | 2 | 2A |
|---|---|---|---|---|
| Red Blood Cells, lb | 42 | 42 | | |
| Whole Fluid Blood, lb.[1] | | | 126 | 126 |
| Sodium Erythorbate, oz | 11½ | | 11½ | |
| Sodium Ascorbate, oz | | 10 | | 10 |
| Sodium Nitrite, oz | 1 | 1 | 1 | 1 |
| Sodium Bicarbonate, oz | 3½–5 | 3½–5 | 3½–5 | 3½–5 |

[1] The whole blood may be defibrinated or may contain anticoagulant.

As previously explained, the red blood cells or the whole blood, either defibrinated or coagulant treated, and which has been warmed to approximately 70–80 degrees F., may be treated first with the sodium erythorbate dissolved in about 80 ounces of water which has been heated to 80–100 degrees F. Agitation of the mixture continues for 5–20 minutes, after which the sodium nitrite, dissolved in about 4 ounces of water also at 80–100 degrees F., is added. This mixture is stirred for 15–20 minutes, generally about 20 minutes, and it is found that the pH is approximately 6.7 to 6.8 at this point. I then add the sodium bicarbonate which has been dissolved in sufficient water to form a solution and agitate for 10 minutes when the pH will have risen to 7.5–7.8. Although the pH at this point is not especially critical, the effect being observed over the range 7.3–9, greater stability is achieved in the dried end product against oxidation and colour deterioration if the pH is held between 7.5 and 8.

The relative proportions of erythorbate, nitrite and bicarbonate can be varied over a range to suit the end product and, as previously mentioned, other reducing agents or combinations thereof and other alkalizing agents may be used and the invention is not to be considered as limited to the formulations given in the examples above.

The nature of the drying technique has a profound effect on the colour of the finished product. It has been found that the application of gentle heat is necessary to develop the full colour and to "set" or fix it. Thus, for example, if the fluid mixture resulting from the examples given above is subjected to the technique of "freeze drying" without the application of heat, a purplish product is obtained which, however, contains a brown component which is considered to be methemoglobin. Such a product, although containing a minor proportion of brown colour, can nevertheless be used with some advantage. Consequently "freeze drying" technique wherein the mixture is frozen and subjected to conditions of vacuum in the frozen state until conversion to powder is achieved, is not excluded from the scope of this invention.

Also, if the fluid mixture is subjected to either atmospheric or vacuum roller or drum drying, because of the heat necessary in this type of drying, the resulting product is badly and uselessly coloured brown. I have found, however, that by spray drying the fluid mixture and by carefully adjusting the temperatures to which the product may be exposed, I can prepare a dried powder which possesses the full red component typified by the compound denatured nitrosohemoglobin. Preferably, drying temperatures below 200 degrees F., and ideally, in the range 150–180 degrees F. give the best results. To one skilled in the art it will be apparent that this temperature range seems to be optimum for the "setting" or fixation of the cured meat colour. The product resulting from spray drying may have a moisture content up to 7–8% but it is perferred to achieve a moisture content less than 2% for maximum stability.

To demonstrate the effect of formula variation on the colour of the dried product a photometric method of measuring the colour was employed. In this test the absorbency of a 0.100% aqueous solution was measured in a photoelectric colorimeter using filters in the 525 mu and 650 mu region. Broadly speaking the higher the reading obtained with the 525 filter, the higher the red colour, and the higher the reading with the 650 filter, the higher the brown colour. It was desired to achieve a high 525 reading and a low 650 reading.

To given quantities of red blood cells was added various levels of erythorbate, nitrite and alkaline buffer as detailed in the accompanying table. The mixtures were spray dried and the resulting dried products were subjected to colour measurement in aqueous solution as described above.

| Experiment No. | Percent Sodium Nitrite [a] | Percent Erythorbate [a] | pH | Photometer Reading [c] 525 mu | Photometer Reading [c] 650 mu |
|---|---|---|---|---|---|
| 1 | 0 | 0 | 6.9 | 64 | 32 |
| 2 | 1 | 0 | 6.9 | 63 | 30 |
| 3 | 2 | 0 | 7.0 | 65 | 27 |
| 4 | 0 | 2 | 7.0 | 73 | 21 |
| 5 | 0 | 4 | 7.1 | 75 | 21 |
| 6 | 1 | 4 | 7.1 | 86 | 13 |
| 7 | 4 | 1 | 7.0 | 71 | 20 |
| 8 | 0.4 | 4 | 7.1 | 88 | 11 |
| 9 | 0.4 | 4 | [b] 7.8 | 91 | 7 |
| 10 | 0.4 | 4 | [b] 8.5 | 89 | 9 |

[a] Based on solids content of red blood cells.
[b] pH adjusted with extra alkali.
[c] 0.100% solutions in distilled water.

For comparison, a 0.6% solution of fresh blood in distilled water gave photometer readings as follows:

525 mu—89
650 mu—5

The relatively high 650 readings in Experiments 1 and 2 above show the substantial presence of brown colour when attempts are made to dry blood cells without employing the teaching of this invention. One also concludes that either nitrite alone or erythorbate alone does not give a product with a suitably low 650 reading. It is evident that a formulation similar to that in Experiment 9 gave a dried product which dissolved in water to give a colour characteristic similar to or very close to that of fresh blood when the latter is dissolved in water. Only when erythorbate and nitrite are used together and in proportion so that the ratio of erythorbate/nitrite is at least 4:1 and preferably 10:1 does the colour approximate that of fresh blood. From Experiment 9 and subsequent repeat runs it has been established that one part by weight of the dried blood cells is equivalent in colour content to six parts of fluid whole blood.

To demonstrate the stability of the product of this invention samples were stored in polyethylene lined containers at ambient temperature. Fresh blood from the same lot used to prepare the product of the invention was stored in similar polyethylene containers both at ambient temperature and at 35 degrees F. Whereas the fresh whole blood was useless owing to putrefaction within 30 hours at 65–70 degrees F. and within 4–5 days at 35 degrees F., the product of this invention has remained useful after 9 months at 65–70 degrees F.

In large scale commercial practice of this invention it is not uncommon to require several days for the collection and accumulation of sufficient quantities of red blood cells. For example, 8 tons of fresh blood were collected during four days and the blood was promptly separated centrifugally. The red blood cells, therefore, were stored at about 35 degrees F. during a period up to four days during which time some bacterial proliferation inevitably occurred. The dried product of this accumulation prepared according to the general formula given in Example 1 had a bacterial count of 1,350,000 per gram. It was subjected to a sterilization treatment in accordance with the method disclosed in Canadian Patent No. 394,981, issued to C. L. Griffith and L. A. Hall, March 4, 1941, wherein gaseous ethylene oxide was the sterilizing agent. The bacterial count was reduced to 700/gm. and the colour remained substantially unchanged. The following colour readings demonstrate this:

|  | 525 mu | 650 mu |
|---|---|---|
| Dried blood cells before sterilization | 91 | 7 |
| Dried blood cells after sterilization | 89 | 11 |

No method is known for sterilizing fluid blood after it is collected without destroying the colour or otherwise rendering it unfit for food use, and the fact that the dried product of this invention can be sterilized is novel. Alternatively gaseous propylene oxide may be substituted for gaseous ethylene oxide, whereas either may be combined with an inert non-flammable carrier such as carbon dioxide, nitrogen, helium or the like. It should be understood, therefore, that in any reference to gaseous ethylene or propylene oxides for sterilizing purposes above referred to it is intended to include thereby mixtures thereof with a suitable carrier.

The product of this invention is uniquely able to be combined with other normally dry sausage ingredients, such as seasonings and fillers, and which has not heretofore been possible thus to augment the production of desirable cured meat colour. This is obviously not possible with fluid blood. Thus, it is possible to add the dried blood cell composition to salt, corn sugar, corn syrup solids, proteinaceous concentrates as, for example, those prepared from soy beans or from casein, spices and spice extractives, cereal flours, skim milk powders, or mixtures thereof to form complete seasoning and filler blends containing a controlled quantity of stable blood pigment chromogen, so that such mixtures can be sterilized and stored for several months before use.

It has been found that the dried blood pigment composition is useful in sausage products generally over the range ½ oz. to 3 oz. per 100 lbs. meat. This is not to be considered as limiting the range of usefulness to this level, but when used, say at 5 or 6 oz. per 100 lbs. meat in a frankfurter formulation the resulting frankfurters have more colour than usual and some consumers could consider them to be over-coloured.

In the following examples the dried blood pigment was added to the seasoning-filler mixture used in a typical frankfurter formulation, and the resulting combination was added to the meat and ice, then comminuted in the usual manner to form a bologna emulsion. This was stuffed into casings and treated in the smokehouse according to regular procedure.

| Frankfurters | Example 3 | Example 4 | Example 5 |
|---|---|---|---|
| Lean Beef Trimmings, lbs | 35 | 35 | 35 |
| Beef Tripe, lbs | 20 | 20 | 20 |
| Pork Head Meat, lbs | 12 | 12 | 12 |
| Back Fat, lbs | 33 | 33 | 33 |
| Seasoning, oz | 8 | 8 | 8 |
| Cure,[1] oz | 6 | 6 | 6 |
| Binder, lbs | 12 | 12 | 12 |
| Salt, oz | 15 | 15 | 15 |
| Ice, lbs | 40 | 50 | 40 |
| Dried Blood Cells, oz | | 2 | |
| Fresh Whole Blood, oz | | | 12 |

| | Example 6 | Example 7 | Example 8 |
|---|---|---|---|
| Bull Beef, lbs | 30 | 30 | 30 |
| Beef Plates, lbs | 20 | 20 | 20 |
| Back Fat, lbs | 25 | 25 | 25 |
| Regular Pork Trimmings, lbs | 25 | 25 | 25 |
| Seasoning,[2] oz | 16 | 16 | 16 |
| Cure,[1] oz | 6 | 6 | 6 |
| Binder, lbs | 12 | 12 | 12 |
| Salt, oz | 8 | 8 | 8 |
| Ice, lbs | 40 | 40 | 40 |
| Dried Blood Cells, oz | | 1 | |
| Fresh Whole Blood, oz | | | 6 |

[1] The cure contained 6% sodium nitrite and 4% sodium nitrate.
[2] The seasoning contained ⅞ oz. sodium erythorbate.

After stuffing and linking the frankfurters were hung in the smokehouse at 140 degrees F. for 1 hour, then raised to 10 degrees F. during the second hour, to 152 degrees F. internal temperature. They were then cold showered for 15 minutes and placed in the 40 degree F. cooler overnight. After peeling, the wieners were examined for colour. Those of Examples 3 and 6 were pale in colour, while those in Examples 4, 5, 7 and 8 had an attractive reddish pink internal colour which was of similar intensity in paired tests. The dried blood cells had been mixed with the seasoning, binder and salt previous to the tests, while the fresh blood was added separately at the time of comminution. These tests show the dried blood cells prepared according to the disclosure of this invention produced the same colour as six times their weight of whole blood.

| Bologna | Example 9 | Example 10 | Example 11 |
|---|---|---|---|
| Beef Franks, lbs | 12 | 12 | 12 |
| Pork Head Meat, lbs | 17 | 17 | 17 |
| Bull Beef, lbs | 30 | 30 | 30 |
| Pork Hearts, lbs | 11 | 11 | 11 |
| Back Fat, lbs | 30 | 30 | 30 |
| Seasoning, oz | 8 | 8 | 8 |
| Cure,[1] oz | 6 | 6 | 6 |
| Salt, oz | 18 | 18 | 18 |
| Binder, lbs | 10 | 10 | 10 |
| Ice and Ice Water, lbs | 30 | 30 | 30 |
| Dried Blood Cells, oz | | 1½ | |
| Fresh Whole Blood, oz | | | 9 |

| | Example 12 | Example 13 | Example 14 |
|---|---|---|---|
| Lean Beef Trimmings, lbs | 40 | 40 | 40 |
| Beef Brisket and Flanks, lbs | 45 | 45 | 45 |
| Beef Tripe, lbs | 15 | 15 | 15 |
| Seasoning,[2] oz | 16 | 16 | 16 |
| Cure,[1] oz | 6 | 6 | 6 |
| Salt, oz | 11 | 11 | 11 |
| Binder, lbs | 10 | 10 | 10 |
| Ice, lbs | 30 | 30 | 30 |
| Dried Blood Cells, oz | | 3 | |
| Fresh Whole Blood, oz | | | 18 |

[1] The curing salt contained 6% sodium nitrite and 4% sodium nitrate.
[2] The seasoning contained ⅞ oz. sodium erythorbate.

The bologna emulsion after comminution was stuffed into casings and hung in the smokehouse for 1 hour at 140 degrees F., then the temperature was raised to 160 degrees F. during the next two hours. Finally steam was admitted to the smokehouse until an internal temperature of 152 degrees F. was reached and the bologna was then cold showered for 20 minutes. The next day, the bologna was sliced and examined for colour. Those of Examples 9 and 12 were relatively pale. Slices from Examples 10 and 11 had an attractive reddish pink colour and were almost equal in appearance, as were slices from Examples 13 and 14.

When representative slices of each test lot were wrapped in a moisture impervious transparent sheet and exposed to the light from a fluorescent fixture it was found that the slices from Examples 9 and 12 faded noticeably within 2 hours and acquired a brownish cast. Those from Examples 11 and 14 began to fade between 3 and 4 hours, while those from Examples 10 and 13 faded to the same extent between 4 and 5 hours.

From the foregoing, it will be appreciated that a dehydrated, substantially naturally blood-coloured powder may be produced and stored, for enhancing the colour of comminuted meat when added thereto.

What I claim as my invention is:

1. The method of preparing a dried animal blood pigment for comminuted meat products from whole blood, defibrinated blood or red blood cells which comprises adding to animal blood an anticoagulant solution, then adding thereto an aqueous solution of an edible reducing agent in quantity capable of reacting therewith as to convert all methemoglobin and oxyhemoglobin to hemoglobin and to provide a measurable excess in order to maintain a reducing medium to inhibit oxidation of the pigment during final drying of the product and then adding an aqueous solution of an alkali metal nitrite in a quantity sufficient only to convert the reduced hemoglobin to nitrosohemoglobin, and finally adding thereto a quantity of a buffer solution of an edible alkaline reacting material sufficient to adjust the pH value to the range of 7 to 9 as to preserve the colour and then converting the mixture to a dry powder wherein the colour characteristics of the red blood cells is retained.

2. The method of preparing dried animal blood pigment for comminuted meat products as claimed in claim 1 in which the buffer solution of an edible alkaline reacting material is added in the quantity sufficient to adjust the pH value to a preferred range of 7.3 to 8.

3. The method of preparing dried animal blood pigment for comminuted meat products as claimed in claim 1 in which the conversion of the mixture to a dry powder is carried out by spray drying said mixture at a temperature between 125° F. and 250° F.

4. The method of preparing dried animal blood pigment for comminuted meat products as claimed in claim 1 in which the drying is effected at a preferred temperature between 150° F. and 200° F.

5. The method of preparing dried animal blood pigment for comminuted meat products as claimed in claim 1 in which the conversion of the mixture to a dry powder is carried out by the technique of "freeze drying" wherein the mixture is frozen and subjected to conditions of vacuum in the frozen state until conversion to a powder is achieved.

6. The method of preparing a dried animal blood pigment for comminuted meat products as claimed in claim 1 including the step of subjecting the formed powder to sterilizing treatment by subjecting it to the action of gaseous ethylene oxide.

7. The method of preparing a dried animal blood pigment for comminuted meat products as claimed in claim 1 including the step of subjecting the formed powder to sterilizing treatment by subjecting it to the action of propylene oxide.

8. The method of preparing a dried animal blood pigment for comminuted meat products from whole blood which comprises adding to blood an anticoagulant solution, separating the plasma from the red blood cells and treating said red blood cells with a quantity of an aqueous solution of a reducing agent capable of reacting therewith as to convert all methemoglobin and oxyhemoglobin to hemoglobin, said solution being employed in such quantity as to maintain a measurable excess thereof wherein such excess acts to inhibit oxidation of nitrosohemoglobin and then adding an aqueous solution of an alkali metal nitrite in a quantity sufficient only to convert the reduced hemoglobin to nitrosohemoglobin, and finally adding thereto a buffer solution of an alkaline reacting material to adjust the pH value to the range of 7.3 to 8 as to preserve the colour during drying and then spray drying said mixture at a temperature between 100° F. and 200° F. to form a powder.

9. The method of preparing a dried animal blood pigment for comminuted meat products as claimed in claim 1, in which the reducing agent is erythorbate.

10. The method of preparing a dried animal blood pigment for comminuted meat products as claimed in claim 1, in which the reducing agent is ascorbate.

11. The method of preparing a dried animal blood pigment for comminuted meat products as claimed in claim 1, in which the reducing agent is an alkali metal salt of erythorbic acid or ascorbic acid.

12. The method of preparing a dried animal blood pigment for comminuted meat products from whole blood, defibrinated blood or red blood cells which comprises added alkali-metal nitrate to an aqueous mass containing red blood cells of animal blood and an excess of edible reducing agent whereby to form nitroso-derivatives of the reduced forms of said red blood cells in the presence of said excess of reducing agent, adding a quantity of a buffering agent of an edible alkaline reacting material sufficient to adjust the pH value to the range of 7 to 9 for preserving the resulting color of said nitroso-derivatives, and then converting the mixture to a dry powder containing said colored pigment, said buffering agent and residual reducing agent.

13. Dried animal blood pigment when produced by the process of claim 12.

References Cited in the file of this patent

UNITED STATES PATENTS

| | | |
|---|---|---|
| 1,956,785 | Allen | May 1, 1934 |
| 2,002,146 | Jensen | May 21, 1935 |
| 2,241,868 | Reimann | May 13, 1941 |
| 2,739,899 | Hollenbeck | Mar. 27, 1956 |